United States Patent [19]

Cary

[11] 4,159,812

[45] Jul. 3, 1979

[54] APPARATUS FOR LOADING A TAPE CASSETTE

[75] Inventor: Paul D. Cary, Fountain Valley, Calif.

[73] Assignee: BASF Aktiengesellschaft, Rheinland, Fed. Rep. of Germany

[21] Appl. No.: 858,634

[22] Filed: Dec. 8, 1977

[51] Int. Cl.² .............................................. G03B 1/04
[52] U.S. Cl. ................................... 242/192; 360/96.6
[58] Field of Search ...................... 242/192, 197–200; 360/92, 93, 96, 132

[56] References Cited

U.S. PATENT DOCUMENTS

| | | | |
|---|---|---|---|
| 3,980,253 | 9/1976 | Burdorf et al. | 242/192 |
| 4,023,748 | 5/1977 | Burdorf et al. | 242/192 |

*Primary Examiner*—Leonard D. Christian
*Attorney, Agent, or Firm*—Fulwider, Patton, Rieber, Lee & Utecht

[57] ABSTRACT

A tape cassette loading mechanism for receiving a hinged cassette containing a tape supply reel and for automatically opening the cassette and advancing the supply reel into an operative position. The mechanism is used with tape transport apparatus of the type having supply and take-up reels driven by surface engagement with a capstan. A pair of pivot arms engage opposite halves of the cassette and pivot apart to open the cassette. A motor-driven lead nut mechanism rotatively drives a control arm to move the pivot arms and thereby open the cassette, and to simultaneously advance the supply reel along an arcuate path into the operative position in engagement with the capstan. The pivot arms simultaneously move the cassette in a lateral direction to match the lateral component of the advancing movement of the supply reel, thereby preventing the opened cassette from physically interfering with the advancing reel.

15 Claims, 12 Drawing Figures

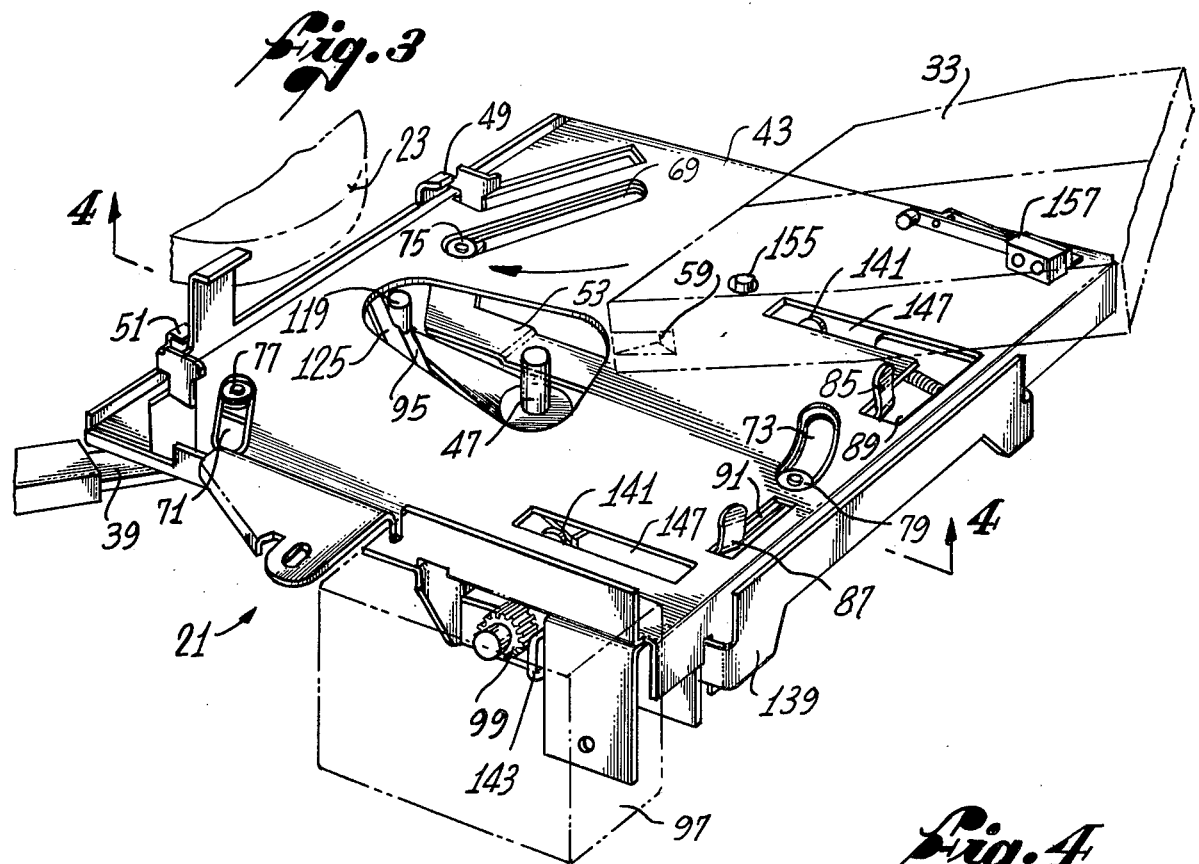
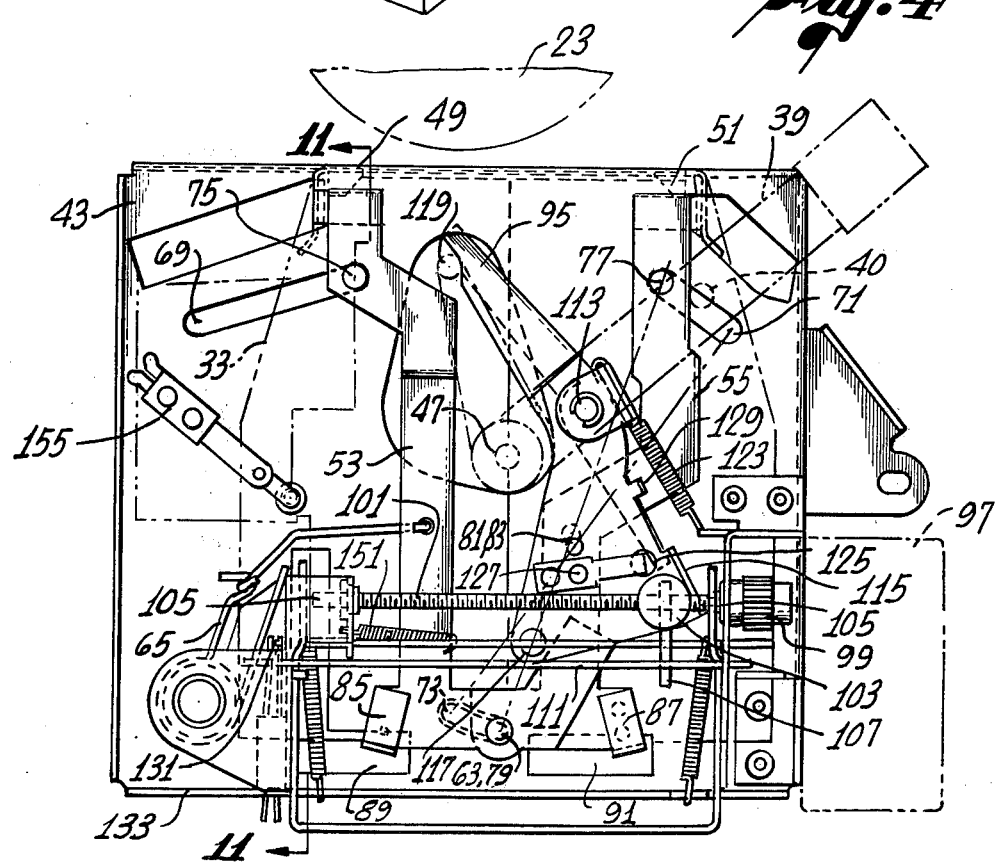

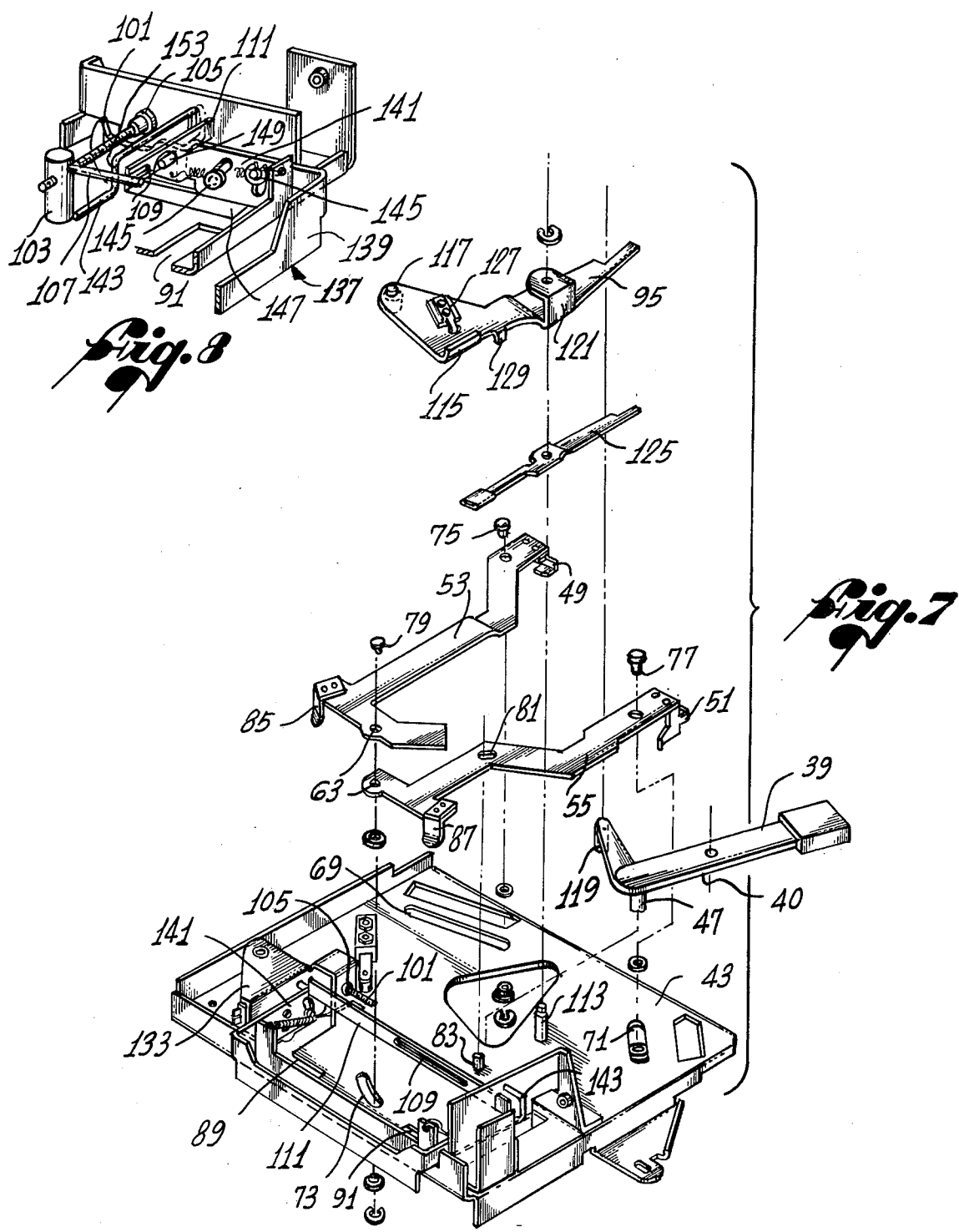

APPARATUS FOR LOADING A TAPE CASSETTE

BACKGROUND OF THE INVENTION

This invention relates generally to tape transport apparatus and, more particularly, to improvements in cassette loading mechanisms for use with such apparatus.

An example of a cassette loading mechanism of this general type is disclosed in U.S. Pat. No. 4,023,748, issued in the name of D. L. Burdorf et al. and entitled "Cassette Loading and Tape Tensioning System". The loading mechanism described therein is shown in use with a tape transport apparatus having a drive capstan, a take-up reel and a supply reel carriage. The loading mechanism receives a hinged cassette containing a supply reel, and guides the hub of the supply reel into engagement with the supply reel carriage. The loading mechanism includes means for opening the cassette and simultaneously advancing the supply reel in a forward direction into surface engagement with the capstan, to drive the tape from the supply reel to the take-up reel.

A major drawback arises when the aforedescribed prior art loading mechanism is used with tape transport apparatus in which the cassette can be opened to only a limited degree and in which the supply reel is moved not only in a forward direction toward the capstan, but also a substantial distance laterally. Such prior art mechanisms are not completely effective because the path of the advancing supply reel will frequently cause the reel to be physically interfered with by the opened cassette. In the past, this interference has been avoided only by utilizing supply reels that are smaller than could otherwise be used.

It will be appreciated from the foregoing that there is a need for a cassette loading mechanism that will receive and open a cassette and permit a tape supply reel located within the cassette to be advanced into engagement with a capstan along a non-linear or otherwise indirect path, without encountering interference from the opened cassette. The present invention fulfills this need.

SUMMARY OF THE INVENTION

This invention resides in an improved apparatus for loading a tape cassette, of the type used with a cassette containing a tape supply reel, in combination with a tape transport device. The loading apparatus includes means for receiving the cassette and means for advancing the supply reel from its load position within the cassette to an operative position relative to the transport device. In accordance with the invention, the loading mechanism further includes means for moving the cassette to prevent the advancing supply reel from physically contacting the cassette.

More particularly, a cassette loading apparatus constructed in accordance with the present invention is especially adaptable for use with a hinged cassette. The mechanism includes pivot arm means for engaging opposite halves of the cassette and pivoting apart to open the cassette. The loading mechanism further includes means, operable simultaneously with the pivot arm means, for advancing the supply reel from its load position within the cassette through the opening formed between the pivoted halves of the cassette to the operative position in engagement with a drive capstan in the tape transport device.

In accordance with one aspect of the invention, the pivot arm means moves laterally, thus also moving the cassette laterally, while the supply reel simultaneously advances toward the capstan. The centerline of the cassette opening is made to follow approximately the center of the supply reel, thereby preventing interference by the cassette with movement of the supply reel.

The pivotal and lateral motion of the pivot arm means to simultaneously open the cassette and allow the supply reel to be advanced without interference, is effected by control means, including a motor-driven lead nut assembly and a pivotally mounted control arm. The precise movement of the pivot arm means is defined by guide slots which receive pins projecting from the pivot arm means. The lead nut assembly and the control arm also control the movement of the supply reel carriage to advance the supply reel along a predetermined path to engage the capstan.

The loading mechanism further includes means for detecting the operational status or location of the lead nut assembly and the control arm and for detecting the engagement of the supply reel with the capstan. Tthis facilitates a proper control of the lead nut motor and enables sequencing of other functions of the tape transport apparatus to be properly initiated.

The above-described operation of the loading mechanism of the present invention can be reversed so that the supply reel can be returned to the cassette and the cassette closed and returned to its original location, from which it can be ejected from the mechanism.

Many other aspects and advantages of the present invention will become apparent from the following description of the preferred embodiment, taken in conjunction with the accompanying drawings, which disclose by way of example, the principles of the invention.

BRIEF DESCRIPTION OF THE DRAWINGS

In the accompanying drawings;

FIG. 3 is a perspective view of the cassette loading apparatus of FIG. 1, showing the pivot arms in their closed positions and the supply reel carriage in its load position, ready to receive the tape cassette;

FIG. 4 is a bottom plan view of the apparatus, taken substantially along the line 4—4 in FIG. 3, showing the lead nut positioned to maintain the pivot arms in their closed positions and the supply reel carriage in its load position;

FIG. 7 is a partial exploded perspective view of the underside of the cassette loading apparatus of FIG. 3;

FIG. 8 is an enlarged fragmentary perspective view of the apparatus of FIG. 3, showing the lead nut and portions of the lead screw, slotted bar and eject mechanism;

DESCRIPTION OF THE PREFERRED EMBODIMENT

Figure 1:
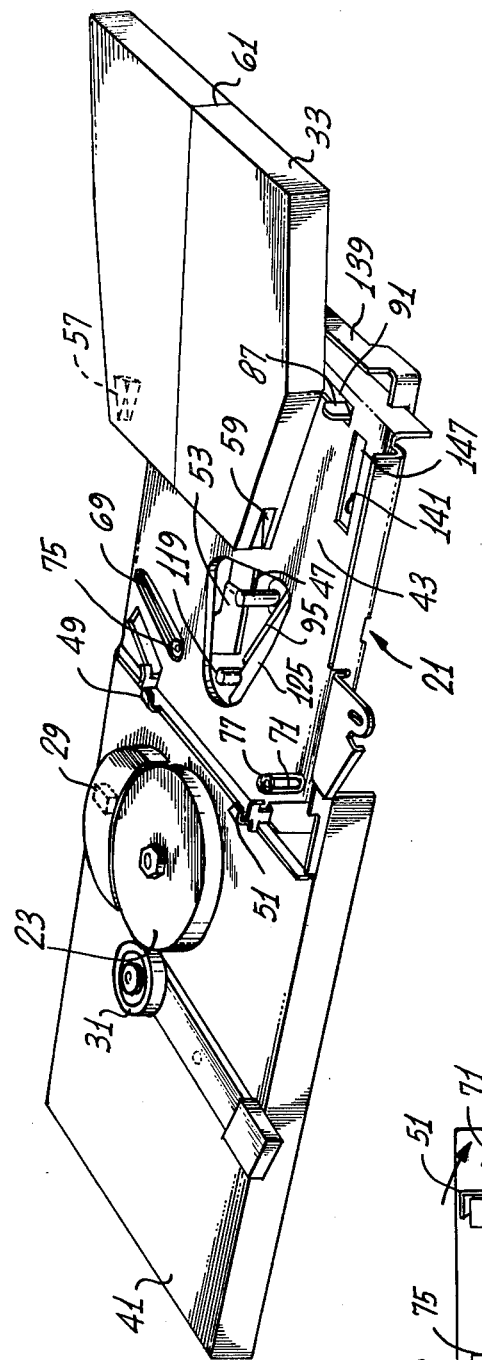
FIG. 1 is a simplified perspective view of an apparatus for loading a tape cassette embodying the present invention, shown in use with a tape transport apparatus.

FIGS. 1 and 3 illustrate a cassette loading mechanism 21 constructed in accordance with the preferred embodiment of the present invention. The mechanism is shown in use with a tape transport apparatus having a capstan 23 that is operative to drive a magnetic tape from a supply reel 27 past a record/playback transducer head 29 to a take-up reel 31.

The cassette loading mechanism 21 receives a hinged cassette 33 containing the supply reel 27, with the hub 35 of the reel being exposed through an opening formed in the underside of the cassette. The cassette is manually inserted into the mechanism, as shown in FIGS. 1 and 3, so that the supply reel hub is snapped into engagement with a shaft 47 on the end of a supply reel carriage 39. The carriage is pivotally mounted to the chassis 41 of the tape transport apparatus at point 40. After insertion, the cassette rests on a plate 43 that is fixed in relation to the transport chassis and a hinged door (not shown) can be closed to cover the cassette.

The mechanism is then operable to advance the supply reel 27 from a load position, where the reel is positioned within the cassette, to an operative position, where the outermost layer of tape 25 on the reel is in surface engagement with the capstan 23. While the supply reel 27 is so engaged, the tape transport apparatus is operable to transfer the tape between the supply reel and the take-up reel. Thereafter, the loading mechanism 21 is operable to return the supply reel 27 to the cassette 33, while simultaneously closing the cassette, and to eject the cassette from the mechanism.

When the cassette 33 is fully inserted into the loading mechanism 21, tabs 49 and 51 located respectively on remote ends of first and second pivot arms 53 and 55 will engage corresponding slots 57 and 59 located on the forward portions of opposite halves of the cassette. This releases an internal cassette locking mechanism (not shown) holding the cassette closed, and the cassette is then ready to be pivoted open on its hinge 61.

Figure 5:
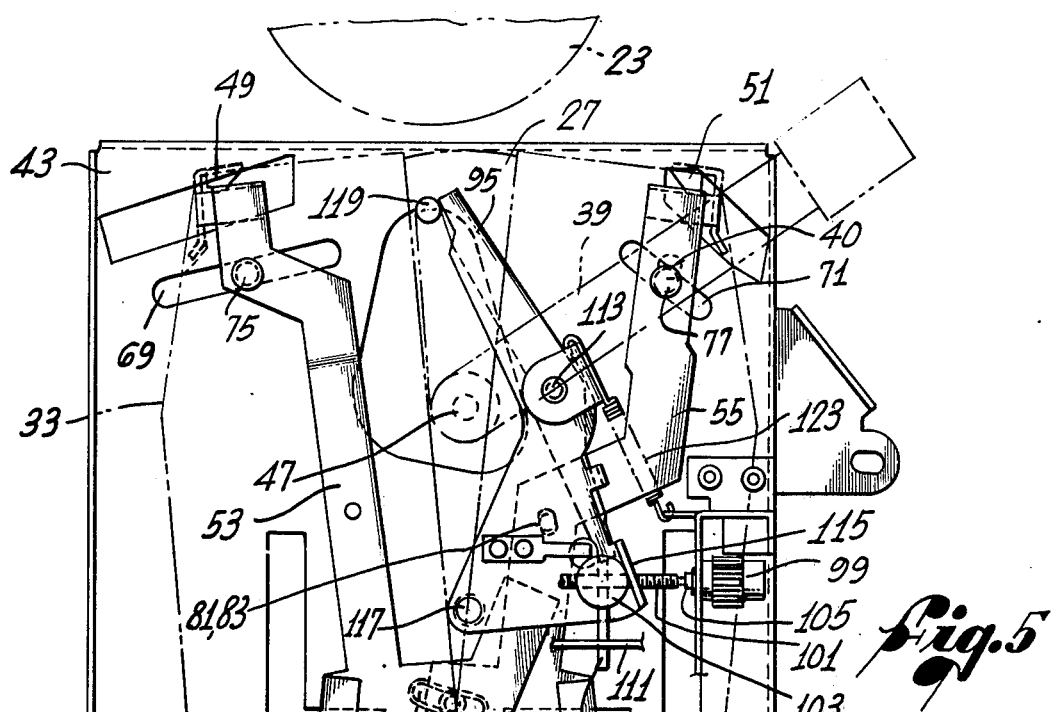
FIG. 5 is a bottom plan view of the cassette loading apparatus, similar to the view of FIG. 4, showing the lead nut having traversed the lead screw a short distance to position the pivot arms half-way open and to position the supply reel carriage a portion of the way toward the capstan.
Figure 6:
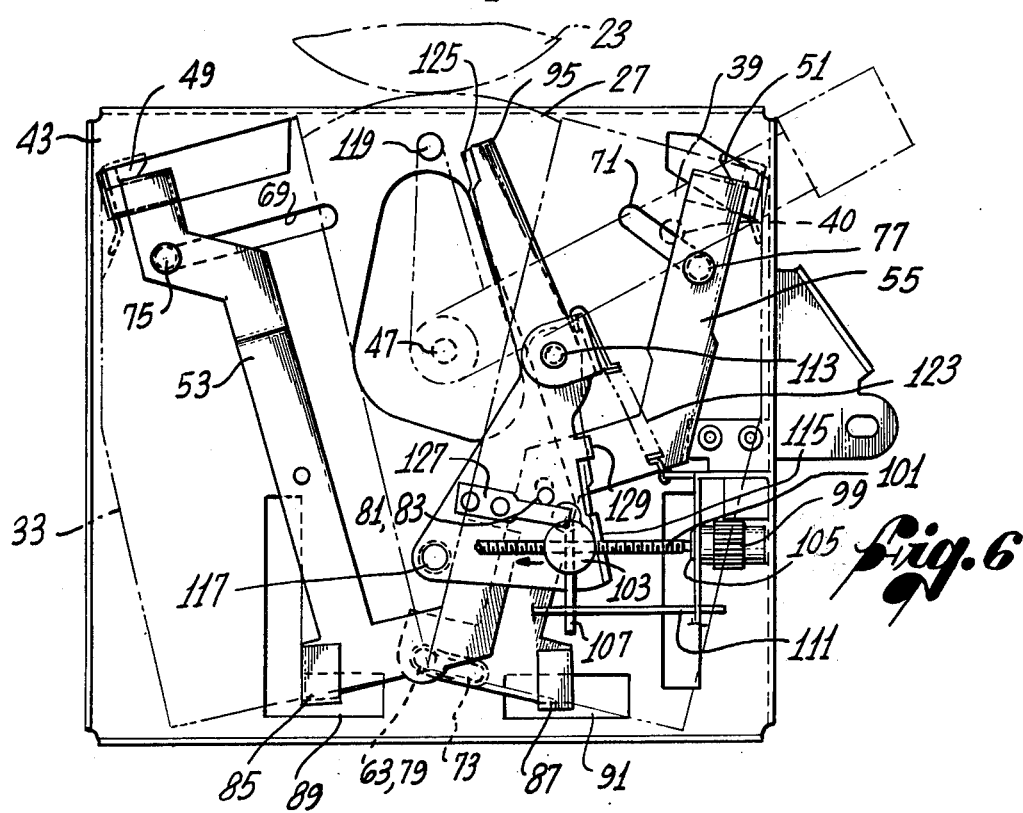
FIG. 6 is a bottom plan view of the cassette loading apparatus, similar to the views of FIGS. 4 and 5, showing the pivot arms in their open positions and the supply reel in surface engagement with the capstan.
Figure 9:
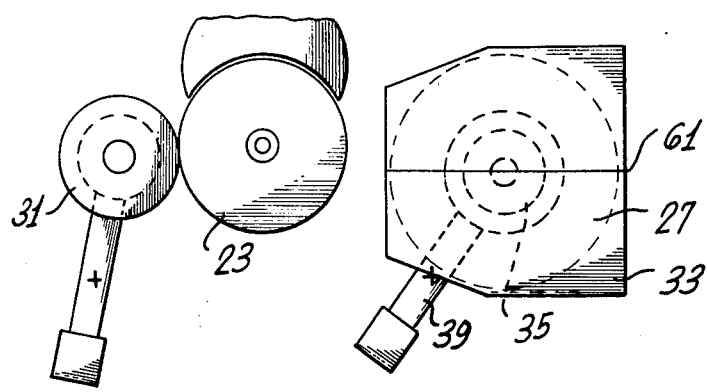
FIG. 9 is simplified top plan view of the tape transport apparatus of FIG. 1, showing the cassette fully closed, with the supply reel positioned within it.
Figure 10:
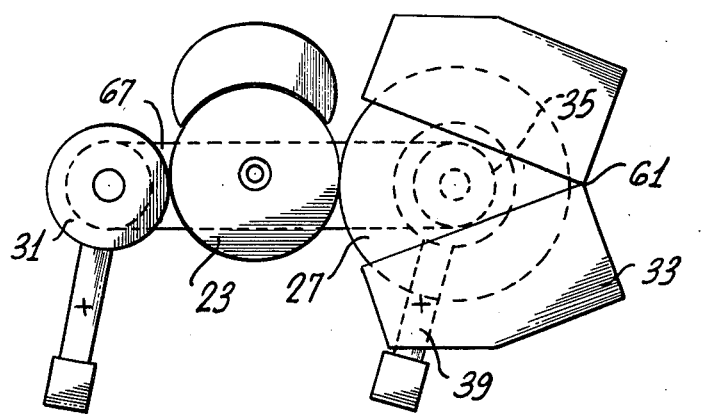
FIG. 10 is a simplified top plan view similar to the view of FIG. 9, showing the cassette fully opened and moved laterally, with the supply reel positioned in engagement with the capstan.

FIGS. 4, 5 and 6 together provide a sequential depiction of the loading mechanism 21 as it opens the cassette 33 and advances the supply reel 27 from the load position to the operative position. The first and second pivot arms 53 and 55 are pinned together at point 63 and, under the urging of a pivot arm spring 65 pivot apart from each other from a closed position to an open position, to open the cassette 33. Simultaneously, the supply reel carriage 39, under the urging of a transport spring 67, pivotally advances the supply reel 27 along an arc from the load position to the operative position.

In accordance with the invention, the pivot arms 53 and 55 together move in a lateral direction as they are being pivoted apart, whereby the centerline of the opening formed in the cassette 33 is made to follow, approximately, the center of the supply reel 27. In this manner, the supply reel can be advanced without being interfered with by the opened cassette 33.

Figure 2:
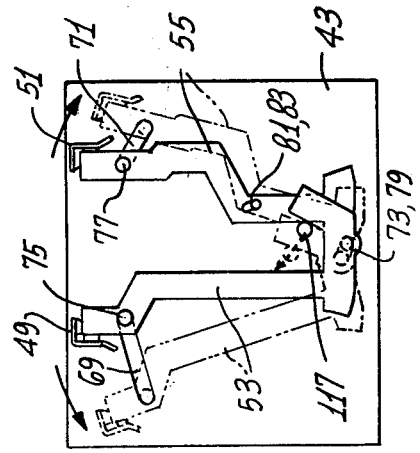
FIG. 2 is a simplified bottom plan view of the cassette loading apparatus of FIG. 1, showing the relative movement of the first and second pivot arms in their respective guide slots.

As best shown in FIGS. 2 and 7, the precise paths along which the two pivot arms 53 and 55 travel are defined by first, second and third guide slots 69, 71 and 73 located in the plate 43 and by a fourth guide slot 81 located in the second pivot arm 55. A first pin 75 located near the remote end of the first pivot arm 53 extends into the first slot 69, and a third pin 79 located at the pinned end 63 of the arm 53 extends into the third slot 73, thereby restricting movement of the arm 53, accordingly. The third pin 79 also extends through the pinned end 63 of the second pivot arm 55 to couple the two pivot arms together.

A fourth pin 83 located on the plate 43 extends into the fourth slot 81 located in a mid-portion of the second pivot arm 55. The fourth pin and fourth slot arrangement, in combination with the third pin 79 and third slot 73 arrangement, restrict movement of the second pivot arm, accordingly. A second pin 77, located near the remote end of the second pivot arm 55, extends into the second slot 71 to help rigidify the arm.

The first slot 69 and first pin 75 arrangement and the second slot 71 and second pin 77 arrangement also serve to maintain the respective tabs 49 and 51 at predetermined heights relative to the plate 43. This insures that the tabs will be in proper position to engage the corresponding slots 57 and 59 located on the cassette 33.

When the pivot arms 53 and 55 are pivoted fully closed, and the cassette 33 thus closed, all the pins 75, 77, 79 and 83 are positioned at a first set of ends of their corresponding slots 69, 71, 73 and 81 (see FIG. 4). Under the urging of the pivot arm spring 65, all four pins begin to move in a controlled fashion along their respective slots (FIG. 5). The four pins all reach a second set of ends of their respective slots simultaneously, whereupon motion of the pivot arms ceases (FIG. 6). Thus, the ends of the pivot arms 53 and 55 which are pinned together, move laterally toward the pivot arm spring 65, while simultaneously the remote ends of the arms move apart from each other. The remote end of the second pivot arm 55 moves a substantially greater distance than that of the first pivot arm 53.

The pivot arms 53 and 55 are formed with spring clips 85 and 87, respectively, which project through openings 89 and 91 in the plate 43 to engage the rear portions of opposite halves of the cassette 33. The clips 85 and 87 and the tabs 49 and 51, which engage the forward portions of the opposite halves of the cassette, thus clutch the cassette halves and move them apart from each other in accordance with movement of the pivot arms 53 and 55. In this manner, the cassette is opened and simultaneously moved laterally so that the centerline of the opening formed in the forward edge of the cassette 33 is made to follow approximately the center of the supply reel 27 as it is advanced along its arcuate path to engagement with the capstan 23.

Although the aforedescribed movement of the pivot arms 53 and 55 and the supply reel carriage 39 occurs under the urging of the pivot arm spring 65, and the transport spring 67, the movement is controlled by a motor-driven lead nut assembly 93 and a control arm 96. The lead nut assembly 93 includes a reversible motor 97, a drive belt/reduction gear assembly 99, a lead screw 101 and a lead nut 103.

As best shown in FIG. 4, the lead screw 101 is journaled at its ends in bearings 105, which are fixed in relation to the plate 43, and is rotatively driven by the motor 97 via the gear assembly 99. The lead nut 103 engages the lead screw 101 and is prevented from rotating along with the screw by a finger 107 that projects from the nut 103 and engages a slot 109 in a bar 111 which extends parallel to the screw. Thus, rotation of the screw 101 causes the nut 103 to traverse the screw. The control arm 95 is pivotally mounted on the plate 43 at point 113.

FIG. 4 shows the relative positions of the lead nut 103 and the control arm 95 when the pivot arms 53 and 55 are pivoted fully closed and the supply reel 27 is in the load position. The lead nut 103 positions the control arm 95 by abutting against a flange 115 formed in the arm. Simultaneously, a control arm post 117 projecting from the control arm 95 abuts against an extension of the first pivot arm 53, to restrain the pivot arm spring 65 from moving the pivot arms 53 and 66. This properly positions the arms in their closed position. Additionally, a carriage post 119 projecting from the supply reel carriage 39 abuts against a portion of the control arm 95, to restrain the transport spring 67 from moving the carriage toward the capstan 23. This properly positions the carriage shaft 47 at a location where it can engage the hub 35 of the supply reel 27.

It will be appreciated that both the pivot arm spring 65 and the transport spring 67 operate to maintain the flange 115 of the control arm 95 in abutment with the lead nut 103 as the nut traverses along the lead screw 101. The pivot arm spring 65 urges the extension of the first pivot arm 53 to continuously abut against the control arm post 117, while simultaneously the transport spring 67 urges the carriage post 119 to continuously abut against the control arm 95. Both of these spring forces urge a rotation of the control arm 95 about its pivot point 113 to maintain the abutment of the flange 115 with the lead nut 103. The control arm 95 has an upstanding portion 121 at its pivot point 113, to provide resistance to rotation about axes other than the pivot axis.

Thus, as the lead nut 103 traverses the lead screw 101 (see FIG. 5), the control arm 95 pivots automatically to follow it. This causes the pivot arms 53 and 55 to pivot apart to open the cassette, and causes the supply reel carriage 39 to advance the supply reel 27 toward the capstan 23. After the lead nut 103 has traversed a predetermined distance along the lead screw 101, the pivot arms 53 and 55 will have reached the limits of their motion and the cassette 33 will then be fully opened. Further traversing by the nut causes the control arm 95 to continue pivoting so that the control arm post 117 no longer abuts against the extension of the first pivot arm 53.

As the lead nut 103 continues to traverse the screw 101, the control arm 95 will follow the nut under the urging of the transport spring 57. The arm will follow the nut until the supply reel 27 has advanced into surface engagement with the capstan 23. After this engagement, a control arm spring 123 will urge the control arm to continue to follow the movement of the lead nut, thereby moving the control arm out of abutment with the carriage post 119 (see FIG. 6). This continued pivoting of the control arm 95, after the supply reel 27 has engaged the capstan 23 is necessary to prevent the arm 95 from interfering with operation of the tape transport apparatus as the tape 25 is driven from the supply reel to the take-up reel 31.

The control means also includes means for detecting engagement of the supply reel 27 with the capstan 23, so that operation of other elements of the tape transport apparatus can be properly initiated. Herein, this detection means includes a sensor arm 125 and a pair of capstan engagement contacts 127.

As shown in FIGS. 4 and 6, the sensor arm 125 is pivotally mounted on the plate 43, at the same pivot point 113 as the control arm 95. In similar fashion to the control arm 95, the sensor arm 125 abuts against the carriage post 119 and is urged pivotally to follow the traversing movement of the lead nut 103 on the lead screw 101. When the supply reel carriage 39 advances the supply reel 27 into engagement with the capstan 23, the carriage post 119 no longer will pivotally urge the sensor arm 125 to follow movement of the lead nut 103, and the arm 125 will thus remain stationary. Since the control arm 95 continues to follow the nut 103 under the urging of the control arm spring 123, the control arm will pivotally move apart from the sensor arm 125. After the control arm 95 has moved a short distance relative to the sensor arm 125, a tab 129 on the control arm contacts a portion of the sensor arm, to cause the sensor arm to thereafter pivot along with the control arm.

The capstan engagement contacts 127 are carried by the control arm 95 and sensor arm 125. They are held "closed" when the two arms are together, in abutment with the carriage post 119, and spring "open" after the supply reel 27 has engaged the capstan 23 and the control arm 95 has been urged by the control arm spring 123 to continue pivoting away from the post 119. The status of the contacts 127 is monitored by control circuitry (not shown) that sequences the operation of the capstan of the tape transport apparatus.

The loading mechanism 21 also includes means for detecting when the lead nut 103 reaches either end of the lead screw 101, so that the reversible motor 97 can be properly turned "off" at that time. The means includes the slotted bar 111, which as previously described also serves to prevent the lead nut 103 from turning along with the screw 101, and a pair of lead nut contacts 131. As shown in FIGS. 7 and 8, the slot 109 in the bar 111, which receives the finer 107 projecting laterally from the lead nut 103, extends a substantial distance parallel to the screw 101. When the nut 103 approaches either end of the screw 101, the finger 107 contacts the corresponding end of the slot 109, whereupon further movement of the nut will correspondingly move the bar 111.

The lead nut contacts 131, which are carried by a panel 133 integral with the chassis plate 43, extend through an aperture 135 in the bar 111 and are normally "open". Movement of the bar 111 in either direction will "close" the contacts 131. The status of the contacts 131 is monitored by the control circuitry (not shown) for controlling the reversible motor 97.

Reversal of the above-described operation of the cassette loading mechanism 21 is readily accomplished by reversing the rotational direction of the motor 97, thereby causing the lead nut 103 to traverse along the lead screw 101 in the opposite direction. The nut 103 will engage the flange 115 on the control arm 95 and force the arm to pivot on its axis 113. The control arm then comes into abutment with the carriage post 119 and returns the supply reel 27 to its original location within the cassette 33, while simultaneously the control arm post 117 comes into abutment with the first pivot arm 53 to pivot the arms 53 and 55 together and thereby close the cassette. When the lead nut 103 nears the end of the screw 101, the slotted bar 111 will be moved and the lead nut contacts 131 "closed", thereby turning the motor 97 "off". The cassette 33 is then ready to be ejected from the mechanism.

Figure 11:
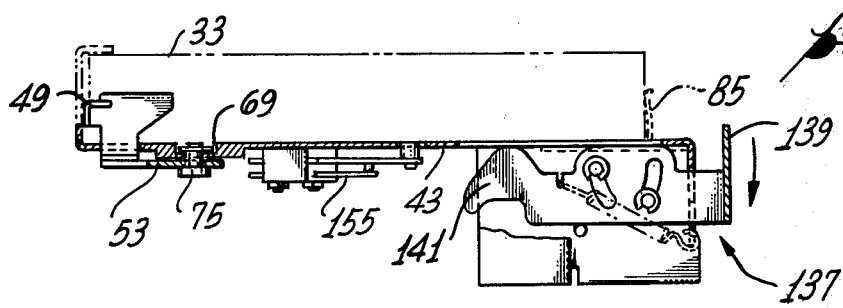
FIG. 11 is a sectional view of the cassette loading apparatus, taken substantially along the line 11—11 in FIG. 4, showing a cassette positioned on the plate of the apparatus.
Figure 12:
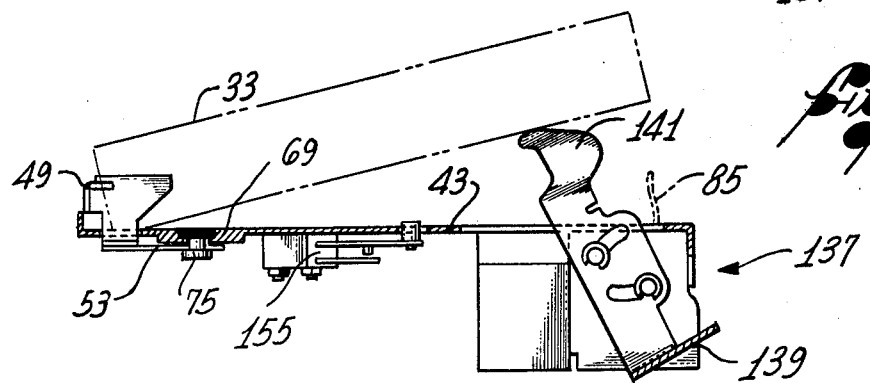
FIG. 12 is sectional view similar to the view of FIG. 11, showing actuation of the eject mechanism to eject the cassette from the apparatus.

As best seen in FIGS. 11 and 12, the cassette 33 is ejected from the loading mechanism 21 by manually operable ejection means 137. The ejection means includes a pivotal bar 139 having a pair of integral eject arms 141, and an inhibit rod 143 that prevents actuation of the bar except when the cassette is fully closed. The bar 139 is actuated by a manually depressible button (not shown), which pivots it on its pivotal mountings 145, thereby causing the eject arms 141 to emerge through openings 147 in the plate 43. These arms forcibly lift the cassette 33, which is positioned on the plate 43, to disengage the hub 35 of the reel from the carriage shaft 47. The cassette 33 can then be removed manually.

The inhibit rod 143 is adapted to pass through holes 149 cut in the eject arms 141 of the bar 139, to prevent the bar from pivoting relative to the plate 43 when the cassette 33 is not fully closed. An inhibit rod spring 151 yieldably urges the rod 143 to be positioned in the holes 149 in the eject arms 141. The rod 143 is formed with a bent portion 153 for being contacted and moved by the finger 107 of the lead nut 103. When the cassette 33 approaches its fully closed position, the lead nut 103 will be located such that the finger 107 first contacts the bent portion 153. Further movement of the lead nut 103 will correspondingly move the rod 143 to extract the rod completely from the holes 149 in the eject arms 141. This frees the arms to eject the cassette.

The cassette loading mechanism 21 also includes a pair of cassette-loaded contacts 155 for detecting the presence of a properly loaded cassette 33, and a pair of record inhibit contacts 157 for detecting the absence of a tab on the cassette 33 indicating that information is not to be recorded on its associated supply reel 27. The contact pairs are monitored by control circuitry (not shown) for properly sequencing operation of the loading mechanism 21 and the tape transport apparatus.

From the foregoing description, it should be apparent that the present invention provides an effective mechanism for loading and unloading a tape cassette for use with a tape transport apparatus. The mechanism opens the cassette and advances the supply reel contained therein into engagement with the capstan of the tape transport apparatus, while simultaneously moving the cassette laterally to prevent any physical interference with the advancing reel.

Although the invention has been described in detail with reference to its presently preferred embodiment, it will be understood by one skilled in the art that various modifications can be made without departing from the spirit and scope of the invention. Accordingly, it is not intended that the invention be limited, excepted as by the appended claims.

I claim:

1. Cassette loading apparatus for use with a tape transport device having a drive capstan and a carriage-mounted supply reel, the supply reel being initially contained within a cassette, said apparatus comprising:
    first means for opening the cassette;
    second means for advancing the supply reel from its position within the cassette into an operative position relative to the capstan; and
    third means for moving the opened cassette in a direction lateral to the direction toward the capstan to maintain the opening formed in the cassette substantially aligned with the advancing supply reel, whereby physical contact between the supply reel and the cassette is prevented.

2. Cassette loading apparatus as defined in claim 1 wherein said first, second and third means are all operable simultaneously.

3. Cassette loading apparatus as defined in claim 1 wherein the carriage on which the supply reel is mounted is moved in a pivotal fashion to advance the supply reel along an arcuate path to the capstan, and wherein the lateral movement of the cassette effected by said third means substantially matches the lateral component of the advancing movement of the supply reel.

4. In a cassette loading apparatus for use with a tape transport device having a tape drive capstan, a take-up reel and a supply reel mounted on a pivotal carriage and initially contained within a cassette, said loading apparatus including means for opening the cassette and means for pivoting the carriage to advance the supply reel from its initial position within the cassette to an operative position with its outermost layer of tape in surface engagement with the capstan, the improvement comprising:
    means for moving the cassette in a direction generally lateral to the direction toward the capstan, to match the lateral movement of the advancing supply reel.

5. Cassette loading apparatus for use with a cassette having opposite sides hinged together, and a tape transport device having a drive capstan, a take-up reel and a carriage mounted supply reel, the supply reel being initially located within the cassette, said apparatus comprising:
    a chassis;
    first and second pivot arms for engaging opposite sides of the hinged cassette, and being movable with respect to each other to open the cassette, each of said pivot arms having a coupled end and a remote end;
    means for coupling together the respective coupled ends of said first and second pivot arms;
    said first and second pivot arms being movable relative to each other from a closed position, wherein the cassette is held closed, to an open position, wherein the cassette is held open, the centerline of the opening formed in the cassette being simultaneously moved a predetermined distance in a direction generally lateral to the direction toward the capstan;
    guide means for receiving portions of said first and second pivot arms and guiding each of said arms along a predetermined path between said closed and open positions; and
    control means operable to move said first and second pivot arms automatically between said closed and open position.

6. Cassette loading apparatus as defined in claim 5 wherein said control means is further operable to move the carriage mounted supply reel between a load position, where the supply reel is located within the cassette, and an operative position, where the supply reel is in surface engagement with the capstan.

7. Cassette loading apparatus as defined in claim 6 wherein the supply reel is mounted on a pivotal carriage, thereby causing the supply reel to be movable along an arcuate path between said load position and said operative position, and wherein said control means is further operable to move the respective coupled ends of said first and second pivot arms in a direction generally lateral to the direction toward the capstan, thereby causing the centerline of the opening formed between the hinged sides in the cassette to follow the lateral component of the movement of the supply reel.

8. Cassette loading apparatus for use with a cassette having opposite sides hinged together, and a tape transport device having a drive capstan, a take-up reel and a supply reel mounted on a pivotal carriage and initially located within the cassette, said apparatus comprising:
   a chassis;
   first and second pivot arms for engaging opposite sides of the hinged cassette, and being movable with respect to each other to open the cassette, each of said pivot arms having a coupled end and a remote end;
   means for coupling together the respective coupled ends of said first and second pivot arms;
   said first and second pivot arms being movable relative to each other from a closed position, wherein the cassette is held closed, to an open position, wherein the cassette is held open, the cassette being simultaneously moved a predetermined distance in a direction generally lateral to the direction toward the capstan;
   guide means for receiving portions of said first and second pivot arms and guiding each of said arms along a predetermined path between said closed and open positions; and
   control means operable to move said first and second pivot arms automatically between said closed and open positions, and to move the carriage mounted supply reel along an arcuate path between a load position, where the supply reel is located within the cassette, and an operative position, where the supply reel is in surface engagement with the capstan;
   said control means being further operable to move the respective coupled ends of said first and second pivot arms in a direction generally lateral to the direction toward the capstan, thereby causing the centerline of the opening formed between the hinged sides in the cassette to follow the lateral component of the movement of the supply reel;
   said control means including
      pivot arm spring means for urging said first and second pivot arms into one of said open and closed positions,
      supply reel spring means for urging the supply reel into said operative position in surface engagement with the capstan, and
      a control arm to controllably move said first and second pivot arms between said closed and open positions and the supply reel between said load and operative positions.

9. Cassette loading apparatus as defined in claim 8 wherein said control arm is pivotally mounted to the chassis.

10. Cassette loading apparatus as defined in claim 8 wherein said first and second pivot arms and the supply reel are moved simultaneously by said control arm.

11. Cassette loading apparatus as defined in claim 8 wherein said control means includes a motor-driven lead nut assembly that abuts a flange formed in said control arm to controllably move said control arm.

12. Cassette loading apparatus as defined in claim 11 wherein said control means further includes first means for detecting the presence of said first and second pivot arms in said open position and second means for detecting the surface engagement of the supply reel with the capstan.

13. A cassette loading mechanism for use with a hinged cassette having opposite halves hinged together, in combination with a tape transport apparatus having supply and take-up reels driven by surface engagement of their outermost layer of tape with a capstan, the supply reel being initially in a load position within the cassette and adapted to be mounted on a pivotal supply reel carriage, said mechanism comprising:
   a chassis;
   first and second pivot arms for engaging opposite halves of the hinged cassette and being movable with respect to each other to open the cassette, each of said pivot arms having a coupled end and a remote end;
   means for rotatively coupling together the respective coupled ends of said first and second pivot arms;
   said first and second pivot arms being rotatively movable relative to each other between a closed position, wherein the cassette is held closed, and an open position, wherein the cassette is held open and wherein the cassette has been moved a predetermined distance in a direction generally lateral to the direction toward the capstan;
   guide slot means for guiding each of said first and second pivot arms along a predetermined path between said closed and open positions, said guide slot means including a plurality of slots formed in the chassis and a plurality of corresponding pins projecting from said first and second pivot arms to engage said slots;
   control means for moving said first and second pivot arms between said closed and open positions, while simultaneously pivoting the pivotal carriage to move the supply reel between the load position within the cassette and an operative position in engagement with the capstan, said control means including:
   pivot arm spring means for urging said first and second pivot arms into said open position;
   supply reel spring means for urging said supply reel into said operative position in engagement with the capstan;
   a control arm pivotally mounted to the chassis and adapted to simultaneously position said first and second pivot arms and said pivotal supply reel carriage; and
   a motor-driven lead nut assembly that abuts a flange formed in said control arm to controllably move said control arm and thereby to controllably move said first and second pivot arms between said closed and open positions and said supply reel carriage between said load and operative positions.

14. A cassette loading mechanism as defined in claim 13 wherein said control means further includes first means for detecting the presence of said first and second pivot arms in said open position and second means for detecting the surface engagement of the supply reel with the capstan.

15. Cassette loading apparatus for use with a cassette having opposite sides hinged together, and a tape transport device having a drive capstan, a take-up reel and a supply reel mounted on a pivotal carriage and initially located within the cassette, said apparatus comprising:

a chassis;

first and second pivot arms for engaging opposite sides of the hinged cassette, and being movable with respect to each other to open the cassette, each of said pivot arms having a coupled end and a remote end;

means for coupling together the respective coupled ends of said first and second pivot arms;

said first and second pivot arms being movable relative to each other from a closed position, wherein the cassette is held closed, to an open position, wherein the cassette is held open, the cassette being simultaneously moved a predetermined distance in a direction generally lateral to the direction toward the capstan;

guide means, including a plurality of slots formed in the chassis and a plurality of corresponding pins projecting from said first and second pivot arms to engage said slots, for guiding each of said arms along a predetermined path between said closed and open positions; and control means operable to move said first and second pivot arms automatically between said closed and open positions, and to move the carriage mounted supply reel along an arcuate path between a load position, where the supply reel is located within the cassette, and an operative position, where the supply reel is in surface engagement with the capstan;

said control means being further operable to move the respective coupled ends of said first and second pivot arms in a direction generally lateral to the direction toward the capstan, thereby causing the centerline of the opening formed between the hinged sides in the cassette to follow the lateral component of the movement of the supply reel.

* * * * *